United States Patent
Morcom (12) 
(10) Patent No.: US 7,248,344 B2
(45) Date of Patent: Jul. 24, 2007

(54) SURFACE PROFILE MEASUREMENT

(75) Inventor: Christopher John Morcom, Broadstairs (GB)

(73) Assignee: Instro Precision Limited (GB)

( * ) Notice: Subject to any disclaimer, the term of this patent is extended or adjusted under 35 U.S.C. 154(b) by 226 days.

(21) Appl. No.: 10/474,293

(22) PCT Filed: Apr. 4, 2002

(86) PCT No.: PCT/GB02/01612

§ 371 (c)(1),
(2), (4) Date: Mar. 15, 2004

(87) PCT Pub. No.: WO02/082016

PCT Pub. Date: Oct. 17, 2002

(65) Prior Publication Data

US 2005/0088644 A1  Apr. 28, 2005

(30) Foreign Application Priority Data

Apr. 4, 2001  (GB) .................... 0108497.9
Apr. 30, 2001  (GB) .................... 0110577.4

(51) Int. Cl.
*G01C 3/02* (2006.01)
(52) U.S. Cl. .................... 356/10; 356/4.01; 356/5.01; 356/5.1
(58) Field of Classification Search .................... 356/10
See application file for complete search history.

(56) References Cited

U.S. PATENT DOCUMENTS

| | | | |
|---|---|---|---|
| 5,057,681 A | * | 10/1991 | Beder et al. ............. 250/208.2 |
| 5,682,229 A | | 10/1997 | Wangler |
| 6,094,270 A | | 7/2000 | Uomori et al. |
| 6,323,942 B1 | | 11/2001 | Bamji |
| 6,407,817 B1 | * | 6/2002 | Norita et al. ............. 356/608 |
| 2001/0048519 A1 | | 12/2001 | Bamji et al. |
| 2002/0003617 A1 | | 1/2002 | Doemens et al. |
| 2002/0036765 A1 | | 3/2002 | McCaffrey et al. |

FOREIGN PATENT DOCUMENTS

| | | | |
|---|---|---|---|
| GB | 2286495 | | 8/1995 |
| JP | 4-274707 | | 9/1992 |
| JP | 5-107359 | | 4/1993 |
| JP | 7-98381 | | 4/1995 |
| WO | WO 97/40342 | | 10/1997 |
| WO | WO 00/36372 | * | 6/2000 |
| WO | WO 00/55642 | | 9/2000 |
| WO | WO 02/082201 | | 10/2002 |

* cited by examiner

*Primary Examiner*—Thomas H. Tarcza
*Assistant Examiner*—Luke D. Ratcliffe
(74) *Attorney, Agent, or Firm*—Blakely Sokoloff Taylor & Zafman (57) ABSTRACT

An imaging system scans a light source output over an object to be imaged, and receives the reflected signal in a multi-region light detector, wherein different regions of the object to be imaged are imaged onto different regions of the detector by the receiving optics, and wherein different regions of the light detector can be actuated separately. The light source scanning is synchronized with the actuation of the light detector so that a region of the detector imaging the region of object being illuminated by the light source is actuated. The time of flight of light signals from the light source to the actuated portion of the detector is calculated for all scanning directions, to enable a three dimensional image of the object to be constructed.

25 Claims, 5 Drawing Sheets

SURFACE PROFILE MEASUREMENT

The present patent application is a non-provisional application of International Application No. PCT/GB02/01612, filed Apr. 4, 2002.

The invention relates to apparatus for measuring the surface profile of a sample, and in particular relates to non-contact 3D surface profile measurement systems.

The non-contact measurement of three-dimensional (3D) objects to extract data regarding their physical form and location in space is a topic which has excited much research. Many techniques have been developed to suit the distance to the object, the precision with which the object's features need to be measured and so on.

Figure 1:
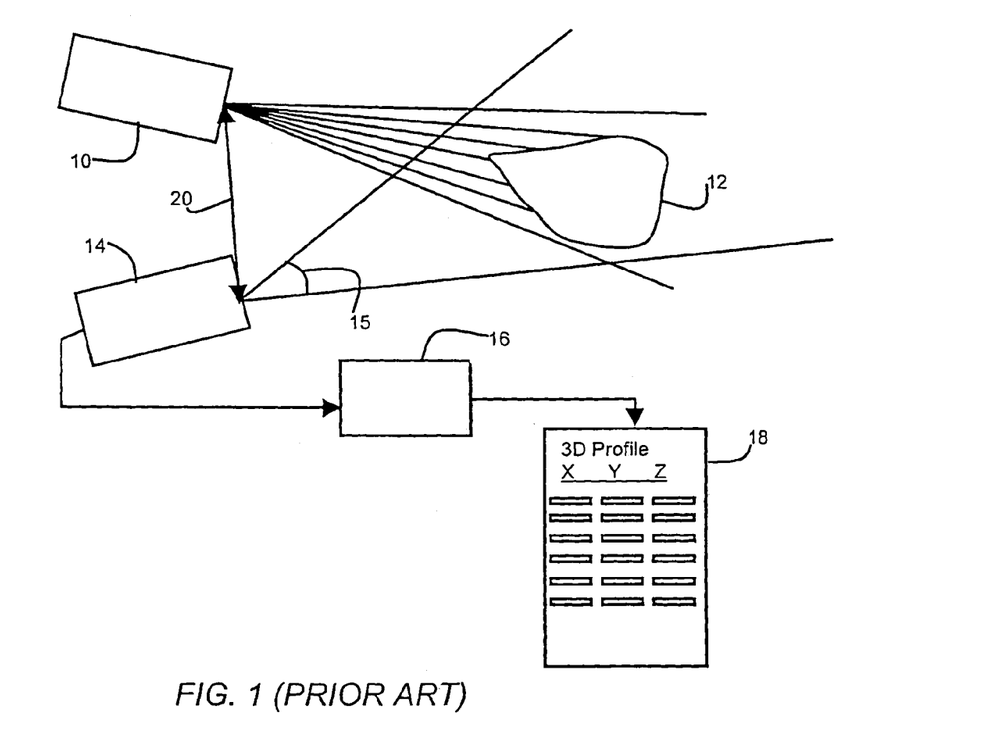
FIG. 1 shows a first known 3D imaging system.

One common technique is to illuminate the remote object with a light source of known pattern; so called "structured illumination". A camera is located some distance away from the structured light source and arranged to collect an image of the projection of the structured light pattern onto the surface of the remote object. FIG. 1 shows this known profile measurement using structured lighting.

A structured light source 10 projects light onto the object 12, and the reflected light is captured by a camera 14 having a field of view 15 which covers the object 12. An image processor 16 derives the 3D profile data 18 by analysis of the deformation of the structured light pattern, which is representative of the distance to the remote object.

The 3D nature of the remote object causes the structured light pattern in the image captured by the camera to be deformed. From knowledge of the physical separation of the camera from the light source (the baseline 20) and trigonometry, it is possible to compute the 3D surface profile of the remote object from the deformation of the image of the structured light pattern.

A benefit of this system is that if a video camera is used to capture the image, then with sufficient processing, the 3D surface profile can be measured at video frame rates (50 or 60 times per second). As this system works on trigonometric principles, the depth accuracy is related to the baseline of the system and the resolution of the sensor. As a result, practical considerations tend to limit the application of such systems to remote objects no more than a few metres away. In addition, as the baseline is lengthened, the angle between the incident light pattern and the line of sight of the camera becomes more obtuse and shadows cast by features in the remote object can obscure the 3D profile measurement.

Figure 2:
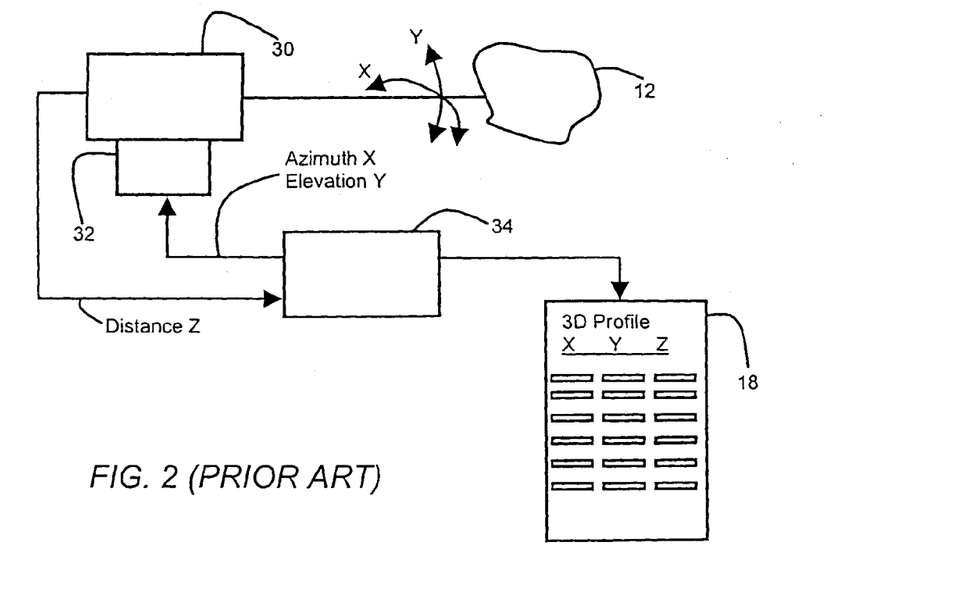
FIG. 2 shows a second know 3D imaging system.

Alternative techniques rely on scanning a device which measures the distance to a remote point; e.g. a laser rangefinder (LRF) or interferometer, using a remote controlled pan and tilt unit. An example of such a system is illustrated in FIG. 2.

A distance measuring device such as a laser rangefinder 30 measures the distance to a single point on the object, and is controlled by a pan-and-tilt unit 32. Control electronics 34 under the control of a computer causes the pan and tilt unit 32 to scan the line of sight of the distance measuring device 30 across the object to be measured to build up a 3D matrix of the azimuth, elevation and distance to the remote object. This matrix of numbers represents the 3D surface profile of the remote object measured in polar co-ordinates from the axis of rotation of the pan and tilt unit. Some corrections may be applied to the data if the axes of rotation of the pan and tilt unit are not co-incident with the line of sight of the measuring device. The resultant 3D surface profile 18 can be transformed to other co-ordinate systems using known mathematical techniques. This technique is analogous to radar systems where the time of flight of a scanned micro-wave radio signal is used to determine the distance to one or more remote objects.

This scanned LRF approach does not suffer from the range limitations of the structured light approach, but is relatively expensive to implement because high precision and costly components are required for good accuracy. In addition, because the whole mass of the distance measuring device is scanned, achieving scanning at rates sufficient to give "real time" 3D image data is problematic.

To overcome this difficulty, systems have been built using a scanned mirror or mirrors in front of the LRF. For example PCT/US97/06793 describes a complex system using two orthogonal mirrors to scan the LRF beam horizontally and vertically so as to cover a field of view of approximately 40°×40°. This approach enables the LRF to remain static. However, the mirror/mirrors must be sufficiently large to encompass both the laser beam and lens aperture of the receiving system without vignetting or optical crosstalk between the emitted laser beam and received beam and so such mirror scanned systems still remain expensive.

Hybrid approaches, where the distance measuring device is scanned along a line in one direction and the remote object is rotated have been used to create a map of the complete surface of a the remote object. However, these techniques are not appropriate for all targets.

Other workers have sought to overcome these problems by scanning the laser beam whilst keeping the detector static, as described in GB 2 286 495. With this approach, the only moving part of the system is a scanned mirror which only need be sufficiently large to steer the laser beam. This avoids the high cost of a precision motorised pan and tilt head and enables a high scan rate. Furthermore, because the laser and receiving optical paths can be kept completely separate there is no risk of optical crosstalk. However, this approach requires the field of view of the receiving optical system to encompass the whole of the remote object. As a result, the optical system will collect illumination from the whole of the field of view. This generates a background offset signal level in the photodetector of the optical system. Whilst this offset level can be compensated for in the signal detection process, the shot noise inherent in the offset signal level significantly degrades the ratio of detected laser signal level to noise and hence reduces the maximum range of the system.

To overcome this significant disadvantage some very complex schemes have been proposed. One such is as described in U.S. Pat. No. 5,682,229 where the reflected light from a scanning laser is focussed onto a stationary detector assembly which uses a series of complex fibre bundles to transfer the collected light to 128 separate avalanche photodiodes and associated time of flight measuring circuitry. It will be appreciated that the complexity and use of relatively expensive components such as coherent fibre-optic assemblies and multiple discrete avalanche photo-diodes makes such approaches expensive to implement.

According to the invention, there is provided an imaging system comprising:
  a light source;
  means for scanning the light from the light source over an object to be imaged;
  stationary receiving optics for receiving light reflected from the object to be imaged;
  a multi-region light detector for detecting light received from the receiving optics, wherein different regions of the object to be imaged are imaged onto different regions of the detector by the receiving optics and wherein different regions of the light detector can be actuated separately;

control means to synchronise the light source scanning and the actuation of the light detector so that a region of the detector imaging the region of the object being illuminated by the light source is actuated; and processing means for measuring the time of flight of light signals from the light source to the actuated portion of the detector for all scanning directions.

The direction of scanning and the associated measured time of flight can be used to build up a three dimensional image of the object. The arrangement of the invention provides a simple structure with few moving parts.

The means for scanning may comprise a reflector for directing the light from the light source to an object to be imaged, and a drive mechanism for controlling movement of the reflector for scanning the light from the light source over the object to be imaged.

According to a second aspect of the invention, there is provided an imaging system comprising:

a light source directed to an object to be imaged;

stationary receiving optics for receiving light reflected from the object to be imaged;

a multi-region light detector for detecting light received from the receiving optics;

control means to synchronise the operation of the light source and the operation of the light detector so that a region of the detector is actuated synchronously with an allocated operation of the light source; and processing means for measuring the time of flight of light signals from the light source to the actuated portion of the detector.

This aspect enables an imaging system to be made with no moving parts, using a multi-region light detector. All regions of the light detector can be actuated in parallel, for high speed image capture. However, different regions of the light detector can preferably be actuated separately. This enables different sub-regions of the light detector to be actuated in sequence, a different operation of the light source being allocated to each sub-region. For example, each sub region may comprises a row or column of detector pixels of a pixel array.

According to a third aspect of the invention, there is provided an imaging system comprising:

a plurality of light sources, each light source being directed to an object to be imaged;

stationary receiving optics for receiving light reflected from the object to be imaged;

a multi-region light detector for detecting light received from the receiving optics, wherein each light source is imaged by the receiving optics onto a different region of the light detector, wherein the different regions of the light detector can be actuated separately;

control means to synchronise the operation of individual light sources and the operation of the light detector so that the region of the detector imaging the region of the object being illuminated by an operating light source is actuated; and processing means for measuring the time of flight of light signals from the operating light source to the actuated portion of the detector for all scanning directions.

According to this aspect, the need to scan the light source output over the object to be imaged is again avoided.

In each of these aspects, the or each light source may comprise a pulsed laser or light emitting diode or diodes, and the output may be modulated, with cross correlation techniques used for the time of flight measurement.

In each of these aspects of the invention, the light detector preferably comprises a photodiode array, which can be implemented at low cost. The photodiode array may be operable in two modes; a first mode in which light signals from all photodiodes in the array are read out in sequence, and a second mode in which light signals from selected photodiodes or sub-groups of photodiodes in the array are read out in a sequence.

The invention also provides a method of obtaining an image of an object, comprising:

scanning a light source signal over the object by directing a light source output in a plurality of scanning directions in sequence, and detecting reflected light received from the object using a two dimensional light detector array;

determining the regions of the light detector array which are illuminated for each scanning direction;

scanning the light source signal over the object again, and detecting reflected light received from the object using only the determined regions of the light detector array;

calculating the time of flight of light pulses from the light source to the detector for each scanning direction; and obtaining a 3D profile from the time of flight calculations.

Examples of the invention will now be described in detail with reference to the accompanying drawings, in which.

The invention provides a 3D imaging system, with a stationary receiving optical system. The invention uses a two dimensional detector, which will first be described with reference to FIG. 3.

Figure 3:
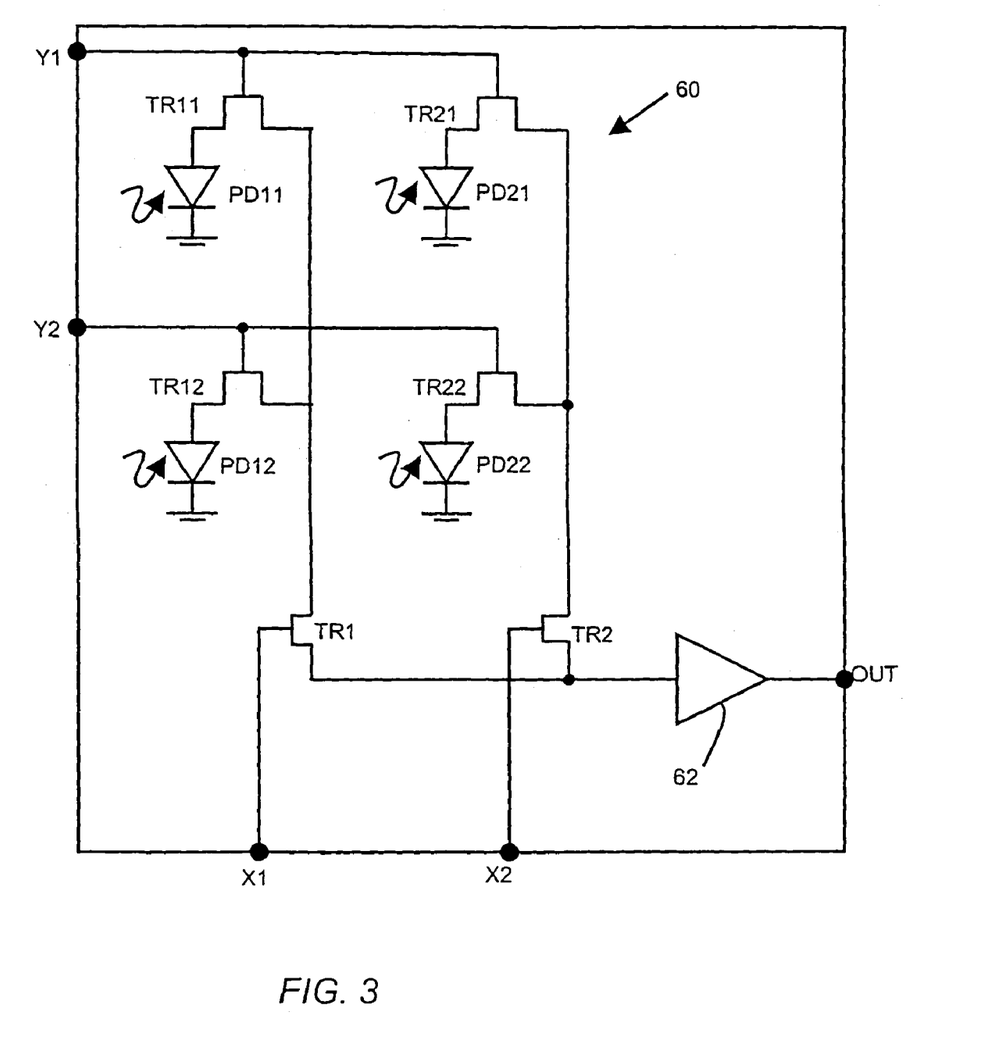
FIG. 3 shows a simplified example of the photodiode array for use in the system of the invention.

FIG. 3 is a simplified schematic of a photodiode array for use in an imaging system of the invention, in a 2×2 format. The device consists of an array of photodiode pixels 60, each of which comprises a photodiode (PD11 to PD22) and associated transistor (TR11 to TR22), which are configured and drive to act as analogue switches. For standard video imaging applications, the device is operated in an integration mode where incident illumination is focussed upon its surface. The incident illumination generates charge within each photodiode by the photoelectric effect. During this integration period, connections X1, X2, Y1 and Y2 are all held low so that all transistors are off and the photodiodes are electrically isolated. The photo-generated charge then accumulates in each photodiode and is stored on the self-capacitance of the photodiode.

Once sufficient photocharge has been collected, the device is readout as follows. Input X1 is taken to a high potential so that TR1 is turned on thereby allowing charge to flow between the column and a charge sensitive amplifier 62. Then input Y1 is pulsed high for addressing a row of pixels, turning TR11 on allowing and the photo-generated charge stored on photodiode PD11 to flow through TR11 and TR1 to the output amplifier 62 where the charge is converted to a voltage. This creates an output signal whose amplitude is proportional to the level of charge stored on PD11 and hence the level of light incident on TR11.

After the self capacitance of PD11 has been discharged, input Y1 is taken low and input Y2 is taken high, allowing the stored charge on PD12 to be readout. In this way, a column of pixels is read out in turn.

After all the charge collected by PD12 has been discharged, Y2 is taken low and X2 is taken high to allow PD21 and PD22 (the pixels in the next column) to be readout sequentially by pulsing Y1 and Y2 in the manner described above.

It can be seen that this process allows the 2×2 array to be scanned and an electrical signal that is the analogue of the incident illumination generated. In normal operation, larger numbers of photodiodes are used, e.g. 256×256, to increase resolution. Often the readout sequence and sensor scanning are arranged to generate a standard video signal.

In addition, it may be noted that the basic structure described here has been simplified for the purpose of describing the proposed invention. Practical X-Y addressed photodiode arrays are generally fabricated as single complementary metal oxide semiconductor (CMOS) large scale integrated circuits (LSI) which include many refinements such as on-chip clock circuitry to generate the pulse sequences for electrodes X1 to Xn and Y1 to Yn. On-chip and additional pixel and/or column level circuitry improve amplification and detection of the photo-charge. These known refinements can be applied with advantage to the 3D profile measurement principle described here.

For 3D profile measurement, the inventor has realised that such X-Y addressed photo-diode arrays can be utilised not in an integrating mode, but as a multiplexer synchronised with the laser scanning and pulsing so that only the individual photodiode receiving the reflected image of the laser spot on the remote object is addressed.

Figure 4:
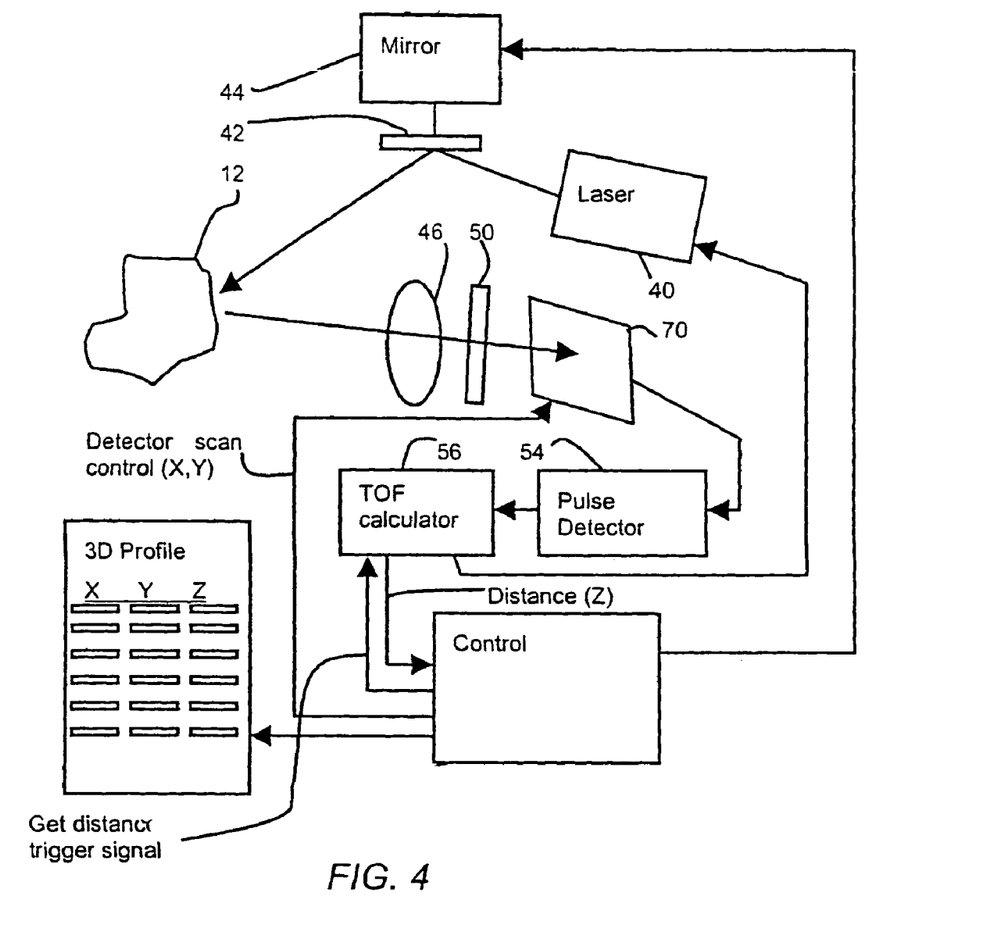
FIG. 4 shows an imaging system of the invention, using the photodiode array of FIG. 3.

FIG. 4 shows a system using the photodiode array in this synchronised mode of operation. A sequentially pulsed laser beam output from a laser 40 is scanned by known means to illuminate a point on the surface of the remote object 12. To minimise size and cost, the laser scanning system 44 may be implemented in a number of ways including using electromagnetically or piezo-electrically scanned mirrors 42 or by mounting a laser chip on a micro-machined silicon or compact piezo electric structure.

An image of the laser spot is formed on the surface of the X-Y addressed photodiode array 70 by the stationary, receiving optical system 46. A narrow band-pass optical filter 50 may be used to reject all wavelengths except those near the laser wavelength and optimise discrimination of the laser pulse against the background illumination.

The control electronics apply logic level signals to the relevant X and Y control lines of the X-Y addressed array so that the photodiode illuminated by the image of the laser spot is connected to the pre-amplifier and time of flight detection electronics 56. In particular, the reflected laser pulse is captured by this photodiode and the resultant electrical signal routed to an electrical pulse detector 54 and TOF (time of flight) measurement circuitry 56. This computes the TOF of the laser pulse to the spot on the remote object and back to the photodiode on the X-Y addressed array and hence distance from the remote object to the X-Y addressed array. This process is then repeated for many points over the surface of the remote object to measure the surface profile of the remote object. If the image formed of the laser spot is larger than a single pixel then the control electronics can cause the detector to address a group of adjacent photodiodes (e.g. a 2×2 sub-array of photodiodes) in parallel to optimise collection and detection of the laser energy.

It can be seen that because only one or a small number of the photodiodes is connected to the receiving amplifier and time of flight electronics at any one time, the background offset signal will be limited to that generated by the part of the field of view focussed onto the individual photodiode/photodiode group, rather than from the whole of the field of view of the optics as for the system described above.

For example, if the laser beam is arranged to sequentially scan 100×100 equispaced points within the optical field of view, then the background signal level collected by each photodiode/photodiode group will be nominally reduced by 10,000 times in comparison to the simple system described above, which confers substantial benefits on system performance.

It may be noted that a simplified version of this system can be used with a linear photodiode array to measure a 2D, rather than 3D surface profile.

The performance of the system can be substantially improved by replacing the pulsed laser source 40 with a modulated laser source and the pulse discriminator 56 by a cross-correlation system. Such systems are known, for example, from DE19949803 to Denso Corp and PCT/GB/04968. In particular, the system may include a signal source such as a laser for supplying a modulation signal and a transmission system connected to the signal source for transmitting a transmitted optical signal modulated by the modulation signal.

The modulation signal may be, for example a maximal length sequence. A reception system is then provided for receiving a reflected and delayed version of the transmitted signal, and a cross-correlator for obtaining the time delay. The cross correlator can be arranged to determine, at a coarse resolution, the time delay of the modulation signal needed to maximise the correlation between the time delayed modulation signal and the received signal. The cross correlator can then determine, at a finer resolution than the coarse resolution, the correlation between the modulation signal and the received signal as a function of the time delay of the modulation signal with respect to the received signal in a smaller time delay range around the determined time delay. A measure of distance is calculated from the time delay of the modulation signal needed to maximise the correlation between the time delayed modulation signal and the received signal.

The cross-correlator can be implemented digitally. In this way, for a given laser peak power, greater energy can then be delivered to the remote object which improves the signal to noise ratio and hence maximum range of the system. This oversampling approach enables the distance resolution of the system to be improved, and the efficient signal processing method using coarse and fine cross-correlators minimises the processing power needed.

In a preferred embodiment, the X-Y sensor, time of flight measurement system and control electronics are fabricated on a single integrated circuit to minimise manufacturing cost. The photodiodes can be manufactured and operated as avalanche photodiodes to provide signal amplification by the avalanche effect, prior to signal detection. The time of flight measurement approach used may be as described above in connection with FIG. 4 or other higher performance schemes described above.

X-Y Sensors such as described here can suffer from image lag which arises because a) the photo charge generated by incident light upon a pixel is partitioned between the photodiode's intrinsic capacitance and the capacitance of the row and column electrodes resulting in some charge being left on the row and column electrode capacitances after each pixel is read out and b) a load transistor may be provided to discharge the photodiode capacitance and bias the amplifier, but the effective resistance of this load transistor increases with declining current increasing the time constant of the system at low light levels.

In a preferred embodiment, this effect may be minimised by configuring the receiving amplifier as a transimpedance amplifier whilst the photodiode array is used in a multiplexer mode. The virtual earth offered by the transimpedance amplifier's input provides a low impedance path through which the photo generated current can flow, reducing the charge partitioning effect and improving system bandwidth. This approach also provides a means to bias the photodiodes during readout. In an optimal development of the preferred embodiment, a transimpedance amplifier stage is provided for each pixel to drive the multiplexing circuitry of the array.

The laser scanning pattern will often be a repeating pattern arranged to cover the optical field of view whilst providing adequate time resolution to measure the position of moving objects in the field of view. The pattern is typically arranged as a conventional raster scan for ease of display on conventional monitors. However, it can be seen that other patterns may be used. One useful pattern is a spiral scan pattern where by controlling the velocity of the laser scan, increased spatial resolution may be achieved in the centre of the scan whilst still maintaining a low spatial resolution to detect objects appearing at the periphery of the scan.

For those applications where it is necessary to monitor the 3D motion of a few specific objects within the field of view, the scan can be controlled adaptively to track the objects and ignore the rest of the field of view. This approach can increase the temporal resolution for the tracked objects.

An important benefit of the approach described here is that the X-Y addressed array can still be operated in an imaging mode, rather than a multiplexed time of flight detector mode. This can be achieved simply by returning the sequence of pulses applied to the X-Y addressed array to a conventional video scanning sequence.

This has several significant benefits. First, for optimal performance, it is important that only the photodiode or local group of photodiodes receiving the image of the laser spot at any point in time are addressed; i.e. that the laser scanning and the photodiode array scanning are synchronised. This would normally require precise calibration of the scanner and optical system. However, if the laser is scanned whilst the sensor is in an imaging mode, an image of the laser path can be collected by the control electronics. This image can be used to determine the precise path of the laser beam image on the surface of the photodiode array and hence set up the correct addressing sequence for the X-Y addressed array and/or laser pulsing sequence, to ensure synchronisation in the multiplexed time of flight detector mode. Thus, the normal addressing mode is used as a calibration stage for the higher performance multiplexing mode. In effect, the system can be self calibrating which is a major benefit for systems which have to operate over large temperature ranges.

Secondly, if the laser is turned off and the X-Y addressed photodiode array is operated in an imaging mode, then the system can be used as a conventional imaging device; i.e. a video or still camera to provide additional information regarding the remote object.

Third, because the same detector is used to capture a 3D surface profile and standard image, the registration between the standard image and 3D data is near perfect.

This enables beneficial combinations of conventional and imaging and 3D profile measuring modes to be used. For example, by toggling the system between capturing a 3D scan and a conventional image scan both a video image sequence and 3D sequence to be captured and overlaid on one another. This approach is particularly beneficial for collision avoidance or intruder detection. If the 3D image shows that an object within the field of view is too close or is on a path likely to lead to a collision, the corresponding part of the conventional image can be coloured or caused to flash to draw, attention to the problem.

Another benefit of capturing perfectly registered 3D and conventional image data is that image processing methods can be applied simultaneously to both sets of data, using the optimal method to extract important features from each image and combining the feature data to yield more information about objects in the field of view. For example, the 3D data can be used to determine the orientation and size of an object in the field of view. This data can then be used to select, or generate from a 3D solid model of a known object, an appropriate pattern for pattern matching and object/target recognition.

It can be seen that the benefits of acquiring perfectly registered 3D and conventional image data are many.

Where higher scanning rates are required, the system described above can be improved by modifying the optics of the laser to illuminate a line, rather than a point, of the remote object and modifying the structure of the X-Y addressed array to permit a row of photodiodes to be connected in parallel to multiple time of flight measurement processors; i.e. a Y scanned, X parallel output array.

Figure 5:
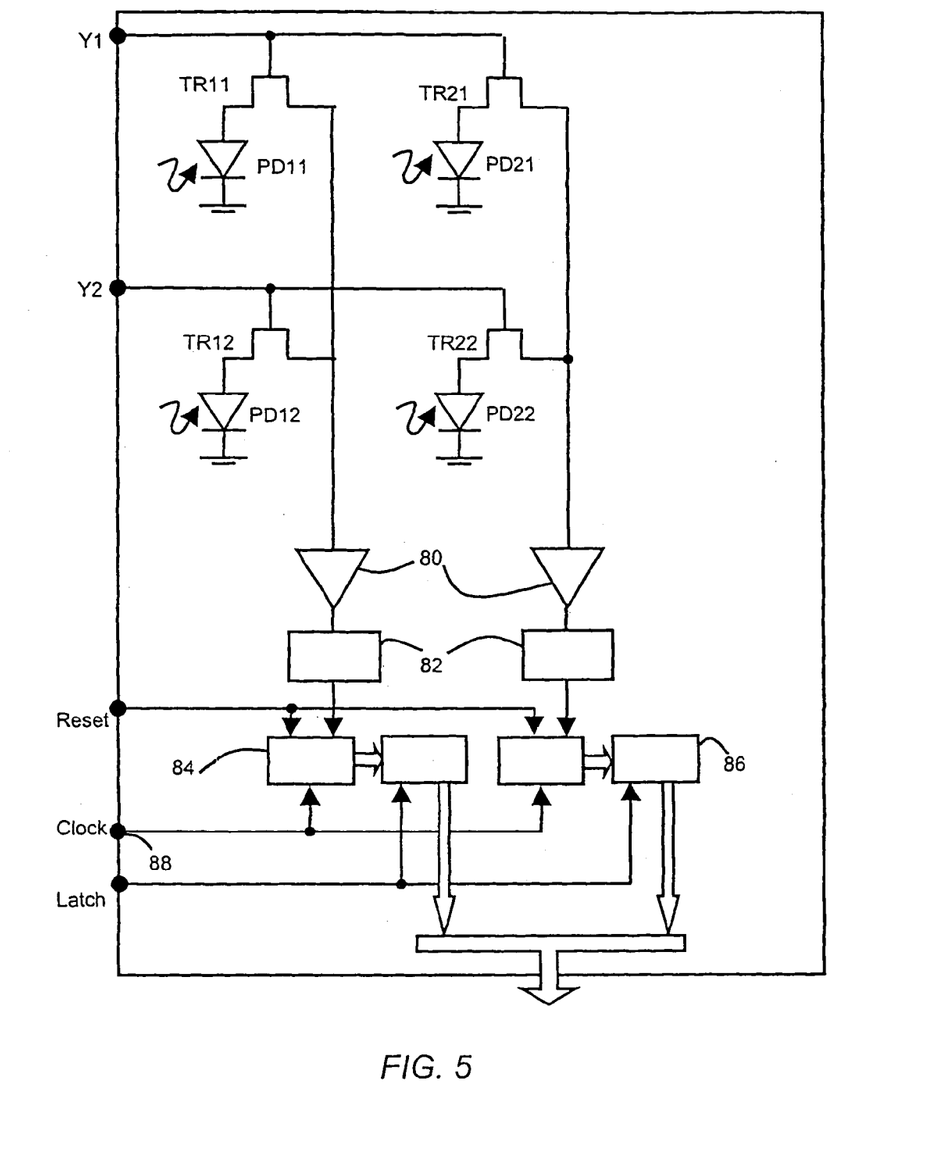
FIG. 5 shows a modification to the photodiode array.

One implementation of the revised photodiode array structure is shown for a 2×2 array in FIG. 5. Each column switch transistor has been replaced by an amplifier 80 and time of flight measurement (TOF) circuitry comprising a pulse detector 82, counter 84 and latch 86.

All counters 84 are clocked at the same frequency by a common clock input 88. The laser scanning system is set to illuminate a strip of the remote object. The image of the illuminated strip is focussed onto row N of the photodiode array. The laser is pulsed on, the TOF counters 84 are reset to zero and the control electronics takes the relevant Y electrode (Y1,Y2) high to connect all the photodiodes along the row to the corresponding amplifier & TOF circuitry. As each photodiode receives the reflected pulse of laser light, the pulse detector causes the corresponding counter 84 to stop counting. Once all reflected pulses have been received, the number held on each counter 84 is latched into the latches 86 and is readout in a normal manner, whilst the next row is illuminated and the process repeated. The numbers stored in each latch are proportional to the time of flight allowing the distance to each of the points illuminated by the laser line and imaged by the photodiodes to be measured.

To improve performance the time of flight measurement circuitry can use the same principles described above.

With this approach, parallax effects must be taken into account for objects close to the optical system. These effects may be minimised either by configuring the laser source and receiving optics to be as close as possible, or preferably co-incident through the use of a beam splitter. Alternatively, the laser line can be defocused to illuminate a broad strip of the remote object and ensure that a single row of photodiodes will all receive reflected light. Another approach is for the control electronics to cause not one, but several photodiodes in each column to be connected to the column amplifier at once. These techniques can be used singly or in combination.

Figure 6:
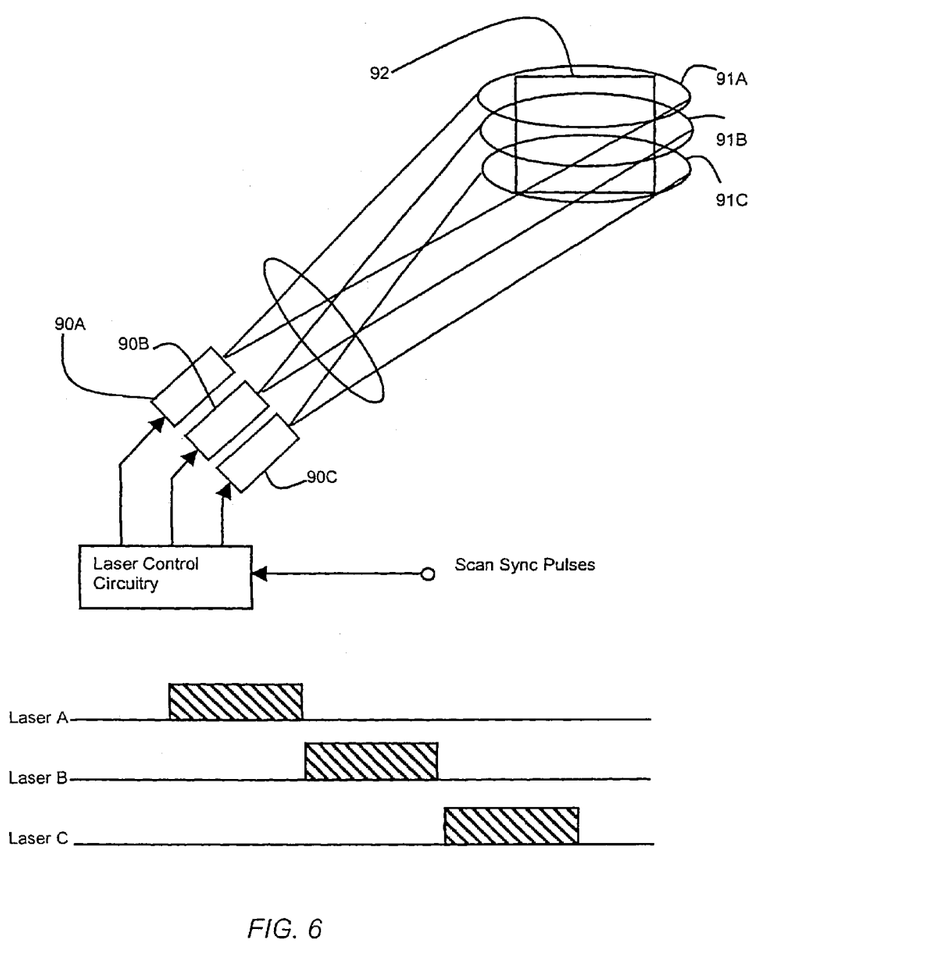
FIG. 6 shows how pulsed light sources can be used in the imaging system of the invention.

To remove the need for any moving parts, an illumination system comprising multiple pulsed or modulated light sources can be used. This approach is illustrated in FIG. 6 which shows an illumination system comprising three laser diodes 90A, 90B, 90C configured so that each laser diode illuminates a region 91A, 91B, 91C of the field of view 92 of the receiving optics. Each light source would be operated in sequence to cause the region of illumination to be synchronised with the readout of the Y scanned, X parallel output array. Preferably, the light sources; e.g. laser diodes or light emitting diodes (LED) are fabricated on a common substrate with integrated drive circuitry to minimise cost. To steer and focus the output of the each individual light source, it is advantageous to fabricate an array of micro-lenses, each aligned with an individual light source.

It can be seen that many alternative laser/multiplexer combinations can be used, depending upon the requirements of the end application.

For example, if it is only required to measure the distance profile along a line, then a one dimensional array of photodiodes may be used. To those skilled in the art of imaging, it will be seen that it is also possible to use a charge coupled device (CCD) as the detector array for measuring the distance profile along a line. This is particularly appropriate with modulated light sources. In this case, a two dimensional CCD array is masked so that the top row of image section pixels, furthest from the parallel readout register is illuminated. The CCD image section is then clocked in a time delay and integrate (TDI) mode in synchronism with the light source modulation to capture the reflected modulation sequence for each pixel in the illuminated row in parallel. The captured sequence can then be readout of the CCD in the normal manner and the data from each column processed using cross correlation to extract the time of flight from the light source to the illuminated pixel at the top of each column.

Alternatively, a very simple system can be realised using a single bright pulsed or modulated light source to illuminate the whole of the field of view simultaneously, and an X-Y addressed array, or a Y scanned, X parallel output array used to capture the 3D image data in the manner described above.

This enables an imaging system to be made with no moving parts. The light source is operated once for each group of pixels of the detector array to be read out simultaneously. For the very highest speed applications, TOF measurement circuitry can be provided for each photodiode in the array. Thus, the group of pixels is the entire array of pixels. This enables the TOF and hence distance to the remote object to be measured in parallel for all points in the field of view.

However, in a lower cost implementation, different regions of the light detector are actuated separately, in a sequence. The sequence may be row-by-row or column-by-column, depending on the row and column driver circuit configurations. This enables different sub-regions (rows or columns) of the light detector to be actuated in sequence, with a different operation of the light source being allocated to each sub-region.

In all examples above, the distance measurement mode of operation of the detector pixel array involves a direct-read mode of operation, in which photogenerated charges pass directly to the measurement circuitry, so that the time of arrival of incident light is known. The imaging mode is an integrating mode of operation, in which charges are allowed to build up on the photodiode self-capacitance (or else on an addition charge storage capacitor in the pixel layout). The row and column driver circuits will need to be operable in these two different modes, and this will typically require different control voltages and timing in the two modes.

The possible specific pixel configurations and control schemes will be apparent to those skilled in the art.

The invention claimed is:

1. An imaging system comprising:
   a light source arrangement directed to an object to be imaged;
   stationary receiving optics for receiving light reflected from the object to be imaged;
   a multi-region light detector for detecting light received from the receiving optics, wherein different regions of the light detector can be actuated separately;
   control means to synchronise the operation of the light source arrangement and the actuation of the light detector so that a region of the detector imaging the region of the object being illuminated by the light source is actuated synchronously with an allocated operation of the light source; and
   processing means for measuring the time of flight of light signals from the light source to the actuated portion of the detector,
   wherein the processing means is selectively operable to measure the time of flight from one of:
   (i) a signal received by an individual region of the detector, or
   (ii) a combined signal received in parallel from a sub-group of regions of the detector.

2. An imaging system as claimed in claim 1, wherein the or each light source is a pulsed laser or light emitting diode or diodes.

3. An imaging system as claimed in claim 1, wherein the light source is a laser or light emitting diode or diodes having a modulated output.

4. An imaging system as claimed in any preceding claim, further comprising:
   a reflector for directing the light from a light source of the light source arrangement to an object to be imaged; and
   a drive mechanism for controlling movement of the reflector for scanning the light from the light source over the object to be imaged.

5. An imaging system as claimed in claim 1, wherein the light source arrangement comprises:
   a plurality of light sources, each light source being directed to an object to be imaged;
   wherein each light source is imaged by the receiving optics onto a different region of the light detector, wherein the different regions of the light detector can be actuated separately, and wherein the different light sources are operated in sequence.

6. An imaging system as claimed in claim 5, wherein each light source comprises a pulsed laser or light emitting diode or diodes.

7. An imaging system as claimed in claim 5, wherein the light source is a laser or light emitting diode or diodes having a modulated output.

8. An imaging system comprising:
   a light source directed to an object to be imaged;
   stationary receiving optics for receiving light reflected from the object to be imaged;
   a multi-region light detector for detecting light received from the receiving optics;
   control means to synchronise the operation of the light source and the operation of the light detector so that a region of the detector is actuated synchronously with an allocated operation of the light source; and processing means for measuring the time of flight of light signals from the light source to the actuated portion of the detector, wherein the light detector is operable in two different modes; a distance measurement mode comprising a direct-read mode of operation for measuring said time of flight of light signals and in which the actuated region of the light detector is connected to the processing means, and an imaging mode comprising an integrating mode of operation in which charges are allowed to build up in the detector without connection to the processing means.

9. An imaging system as claimed in claim 8, wherein all regions of the light detector are actuated in parallel.

10. An imaging system as claimed in claim 8, wherein different regions of the light detector can be actuated separately.

11. An imaging system as claimed in claim 10, wherein different sub-regions of the light detector are actuated in sequence, a different operation of the light source being allocated to each sub-region.

12. An imaging system as claimed in claim 10, wherein each sub region comprises a row or column of detector pixels of a pixel array.

13. An imaging system as claimed in claim 8, wherein the light source comprises a pulsed laser or light emitting diode or diodes.

14. An imaging system as claimed in claim 8, wherein the light source is a laser or light emitting diode or diodes having a modulated output.

15. An imaging system as claimed in claim 1, 5 or 8, wherein the light detector comprises a photodiode array.

16. An imaging system as claimed in claim 15, wherein the photodiode array is operable in two modes, a first mode in which light signals from all photodiodes in the array are read out in sequence, and a second mode in which light signals from selected photodiodes or sub-groups of photodiodes in the array are read out in a sequence.

17. An imaging system as claimed in claim 15, wherein the processing means is integrated onto the same substrate as the photodiode array.

18. An imaging system as claimed in claim 15, wherein multiple channels of time of flight measurement circuitry are integrated onto the same substrate as the photodiode array and configured to process signals from different actuated portions of the photodiode array in parallel.

19. An imaging system as claimed in claim 1, 5 or 8, wherein the processing means uses cross-correlation for measuring the time of flight of light signals from the light source to the actuated portion of the detector.

20. A method of obtaining an image of an object, comprising:

scanning a light source signal over the object by directing a light source output in a plurality of scanning directions in sequence, and detecting reflected light received from the object using a two dimensional light detector array;

determining the regions of the light detector array which are illuminated for each scanning direction;

scanning the light source signal over the object again, and detecting reflected light received from the object using only the determined regions of the light detector array;

calculating the time of flight of light pulses from the light source to the detector for each scanning direction; and obtaining a 3D profile from the time of flight calculations.

21. A method as claimed in claim 20, wherein the scanning of the light source is synchronised with the actuation of selected regions of the light detector array.

22. A method as claimed in claim 20 or 21, wherein the light source signal comprises a pulsed laser output or output of a light emitting diode or diodes.

23. A method as claimed in claim 20 or 21, wherein the light source signal comprises a modulated output of a laser or light emitting diode or diodes.

24. A method as claimed in claim 23, wherein calculating the time of flight uses cross-correlation.

25. A method as claimed in claim 20, wherein the determined regions can be selected to comprise a single region or a sub-group of regions of the light detector array with the signals received in parallel.

* * * * *